INVENTOR
CARL D. BRESKE
BY Lindenberg + Freilich
ATTORNEYS

April 22, 1969 C. D. BRESKE 3,439,988

APPARATUS FOR INSPECTING A REFLECTIVE SURFACE WHICH INCLUDES A PROJECTOR OF A PATTERN OF LINES HAVING DIFFERENT THICKNESSES

Filed April 27, 1964

INVENTOR
CARL D. BRESKE
BY Samuel Lindenberg
Arthur Freilich
ATTORNEYS

United States Patent Office 3,439,988
Patented Apr. 22, 1969

3,439,988

APPARATUS FOR INSPECTING A REFLECTIVE SURFACE WHICH INCLUDES A PROJECTOR OF A PATTERN OF LINES HAVING DIFFERENT THICKNESSES

Carl D. Breske, St. Paul, Minn., assignor to Data Products Corporation, St. Paul, Minn., a corporation of Delaware
Filed Apr. 27, 1964, Ser. No. 362,903
Int. Cl. G01n *21/16, 21/32;* G01b *11/30*
U.S. Cl. 356—237 1 Claim

ABSTRACT OF THE DISCLOSURE

A method and apparatus useful for inspecting a substantially flat surface for imperfections. The surface is inspected by illuminating it with a pattern comprised of one or more lines. The light is reflected from the surface against a target. Any imperfection in the surface will distort the reflected line of light and will be apparent to an operator observing the reflected light. Preferably, the pattern includes calibrated parallel lines of different thickness so that an operator can judge the dimensions of a surface imperfection.

This invention relates generally to a method and apparatus for inspecting surfaces for imperfections and is particularly useful for inspecting magnetic discs of the type finding utility in digital storage systems.

Magnetic disc storage systems have in recent years been finding an increasing number of applications inasmuch as they possess accessing speed and storage capacity characteristics which fall approximately midway between high capacity but slow magnetic tape storage and low capacity but high speed magnetic core storage. It is to be understood that the terms "low" and "high" capacity refer generally to the number of binary digits that can be stored by a system of a given cost.

In order to maximize the storage capabilities of magnetic discs, it is desirable to record information as densely as possible. Of course however, the more densely information is recorded, the more difficult it is to subsequently read that information correctly and the more likely it becomes that information will be lost because of what is often referred to as "drop out." Drop out is usually caused by voids in the magnetic oxide or imperfections (such as depressions or high spots) in the surface supporting the oxide. Usually, surface imperfections can be removed or at least reduced to tolerable levels by properly machining the disc once the existence and location of the imperfections become known.

In view of the foregoing, it is an object of the present invention to provide a method and apparatus for inspecting surfaces for locating any imperfections thereon.

It is a more particular object of the present invention to provide a method and apparatus for inspecting magnetic disc surfaces.

It is an additional object of this invention to provide apparatus for inspecting surfaces to locate imperfections thereon and in addition for indicating the magnitude of the imperfections.

It is a still additional object of this invention to provide surface inspection apparatus which is exceedingly reliable and relatively inexpensive.

Briefly, in accordance with one aspect of the present invention, the surface to be inspect is illuminated with a narrow slit of light which is reflected by the surface. Any imperfection in the surface will distort the reflected light and will be apparent to an operator observing the reflected light.

In accordance with a further aspect of the present invention, a plurality of dark lines each having a different thickness is reflected off the surface to be inspected. Each dark line can be calibrated so as to permit the depth of a hole or height of a high spot to be determined. For example, a small hole may break the continuity of a very narrow reflected line but may have little or no effect on a wider line.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
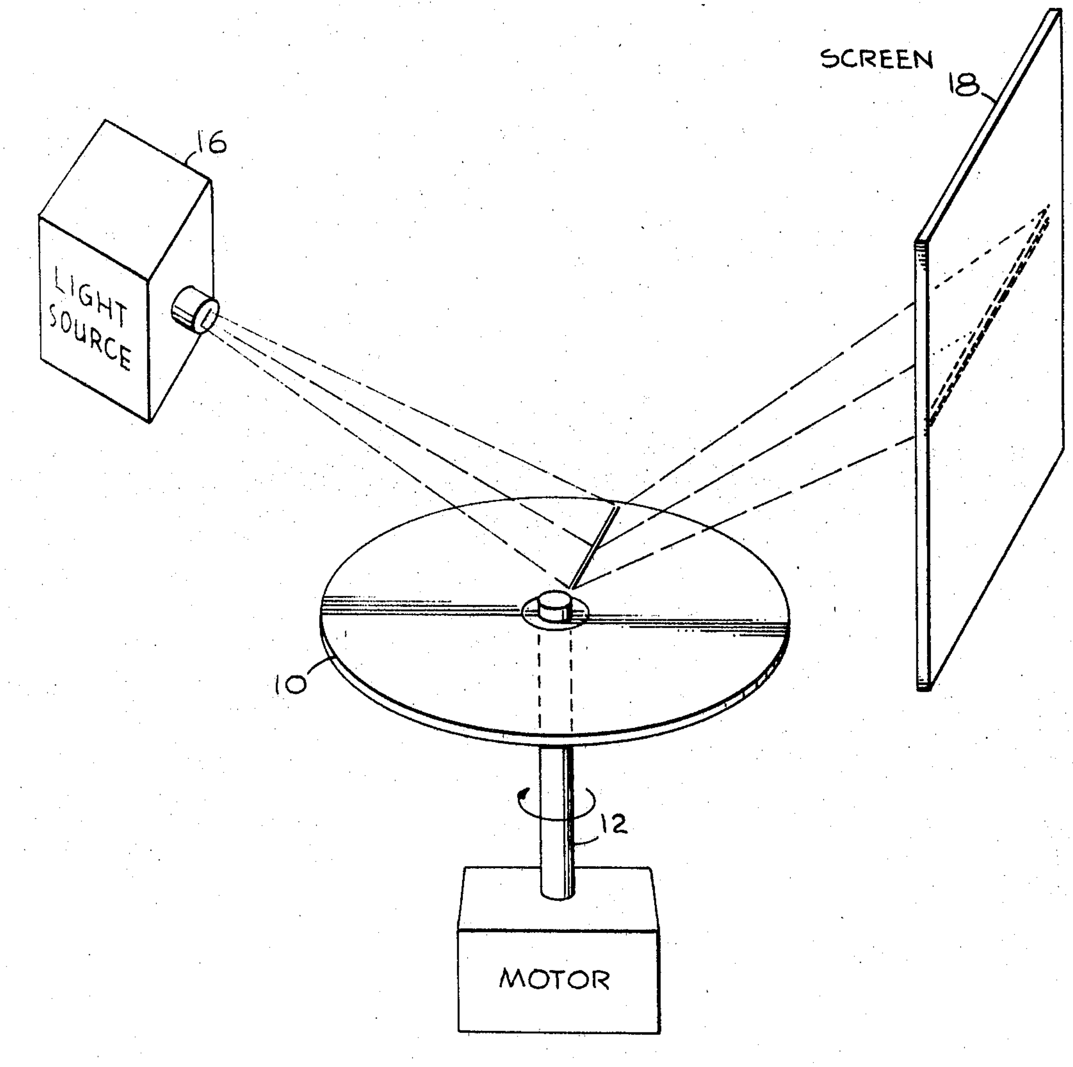
FIGURE 1 is a diagrammatic view of a preferred embodiment of the present invention.

Attention is now called to FIGURE 1 which illustrates apparatus for inspecting the surface of a disc 10 of the type which can be provided with a magnetic coating and used for digital storage. The disc 10 is adapted to be secured to the shaft 12 of a motor which can rotate the disc at a relatively slow rate.

Positioned to one side of the disc is a light source 16 which preferably comprises a slide projector having a pinhole light source therein. The projector 16 is oriented with respect to the disc and a screen 18 so that light provided by the projector 16 will be reflected from the disc surface to the screen 18. Preferably, in order to assure a sharp image on the screen 18, the focal length of the projector lens should be equal to the sum of the distances from the projector to the disc and from the disc to the screen.

Figure 2:
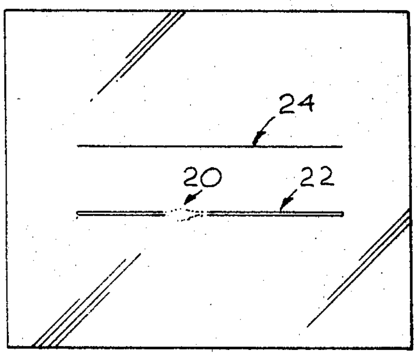
FIGURE 2 illustrates a first light pattern which can be utilized in the apparatus of FIGURE 1.

FIGURE 2 illustrates an initial light pattern which can be generated by the projector 16 for indicating to an operator observing the screen 18, whether any imperfections exist on the disc surface. In accordance with FIGURE 2, a narrow line or split of light having a length substantially equal to the radius of the disc 10, is projected on the disc resulting in the appearance of a line of reflected light 22 on the screen 18. When the split of light incident on the disc intersects an imperfection, e.g., a depression, on the disc surface, the reflected light on the screen 18 will be discontinuous as shown at 20 inasmuch as the depression will tend to concentrate the light incident thereon providing a bright spot on screen 18. On the other hand, wherever the light slit incident on the disc 10 intersects a high point, a portion of the light will scatter on the screen and the discontinuity 20 will appear as a dark spot. In order to facilitate an operator's observation of the reflected light 22, a reference line 24 can be cast on the screen 18 such that it extends parallel to the reflected light 22. Provision of the reference line 24 enables an operator to more easily discern variations in the reflected light 22. When a discontinuity in the reflected light 22 is noted, the observing operator can mark the disc appropriately so that the disc surface can later be machined to remove the imperfection or to reduce it to within tolerable limits.

Figure 3:
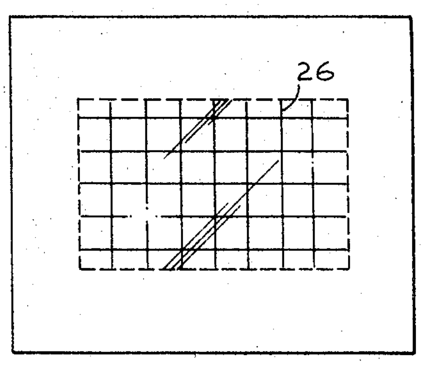
FIGURE 3 illustrates a second light pattern which can be utilized in the apparatus of FIGURE 1.

FIGURE 3 illustrates an alternative light pattern which can be projected on the disc in lieu of the slit 22. The pattern in FIGURE 3 consists of a grid of perpendicularly intersecting dark lines 26. By observing the reflected grid pattern on screen 18, the operator can more readily locate the actual position of an imperfection on the disc surface by referencing the imperfection to the intersections of the grid lines. A reference grid light pattern can also be projected on the screen 18 together with the pattern of FIGURE 3 in order to better enable the operator to discern line discontinuities.

Figure 4:
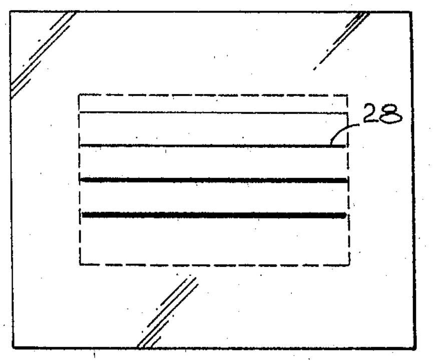
FIGURE 4 illustrates a third light pattern which can be utilized in the apparatus of FIGURE 1.

Attention is now called to FIGURE 4 which illustrates a light pattern comprised of a series of lines 28 each of which has a different thickness. Thus, one of the lines can have a thickness of .001 inch, the second line .002 inch, the third line .003 inch, and the fourth line .004 inch. By utilizing lines having different thicknesses, and by properly calibrating the lines and the dimensions of depressions and high points encountered on the disc surfaces, the dimension of a particular imperfection can be determined by the operator on the basis of how the imperfection affects the various lines 28. For example, a given depression may cause a discontinuity in the line having a thickness of .002 inch but may have no affect on the line having a thickness of .004 inch. With this information and calibration information, the operator can conclude as to what the dimensions of the particular imperfection are. Certain detectable imperfections might of course fall within the tolerance range permitted and therefore may not require any machining to remove or reduce their effect.

The pattern illustrated in FIGURE 2 can be projected on the disc surface by providing a slide transparency which is entirely opaque except where it is desired that a split of light be incident on the disc surface.

The patterns illustrated in FIGURES 3 and 4 can be projected on the disc surface by providing slide transparencies having these patterns thereon. Each such slide transparency can be entirely transparent except for the grid or series of lines to be reflected from the disc's surface.

From the foregoing, it should be apparent that a method and apparatus for inspecting the surface of a disc and other objects has been disclosed herein. Although not expensive, the practice of the invention disclosed herein is very effective for locating surface imperfections. Although preferred light patterns and preferred applications have been specifically discussed herein, it should be appreciated that the teachings of the invention could be readily extended. Thus, for example, a clear transparency can be used to illuminate an entire surface to permit an overall picture of any reflective surface to be obtained. Also, utilization of the invention permits a surface to be rapidly scanned to detect the presence of a defective area. The defective area can then be more critically examined with sensitive surface measuring equipment.

I claim:

1. Apparatus for facilitating the inspection of a magnetic disc having a substantially planar surface in order to locate any depressions or high spots on said surface comprising light source means providing an illumination pattern defining a plurality of substantially parallel straight lines having graduated thicknesses; said light source means being oriented relative to said surface for causing said illumination pattern to be incident on said surface at an acute angle with the pattern lines substantially perpendicular to a plane defined by the incident light and normal to said surface;

a substantially planar target positioned opposite to said light source means and substantially perpendicular to said surface to receive light specularly reflected from said surface; and means for moving said surface relative to said light source means so as to sweep the incident pattern across said surface.

References Cited

UNITED STATES PATENTS

| | | | |
|---|---|---|---|
| 2,247,047 | 6/1941 | Bishop | 88—14 |
| 2,755,702 | 7/1956 | Cook | 88—14 |

OTHER REFERENCES

Optical Magnetic Tape Inspector, Hayunga, IBM Technical Disclosure Bulletin, p. 40, vol. 6, No. 3, August 1963.

Disk Inspection, Scientific American, p. 178, October 1946.

JEWELL H. PEDERSEN, *Primary Examiner.*

O. B. CHEW II, *Assistant Examiner.*

U.S. Cl. X.R.

88—24; 356—120